United States Patent
Kotzin

(10) Patent No.: US 7,395,048 B2
(45) Date of Patent: Jul. 1, 2008

(54) UNSOLICITED WIRELESS CONTENT DELIVERY AND BILLING APPARATUS AND METHOD

(75) Inventor: Michael Kotzin, Buffalo Grove, IL (US)

(73) Assignee: Motorola, Inc., Schaumburg, IL (US)

( * ) Notice: Subject to any disclaimer, the term of this patent is extended or adjusted under 35 U.S.C. 154(b) by 789 days.

(21) Appl. No.: 10/329,609

(22) Filed: Dec. 26, 2002

(65) Prior Publication Data
US 2004/0127235 A1 Jul. 1, 2004

(51) Int. Cl.
*H04M 11/00* (2006.01)
(52) U.S. Cl. .................. 455/406; 455/405; 379/114.13
(58) Field of Classification Search ................ 455/406, 455/466, 403, 3.06, 407, 408, 412.1, 412.2, 455/414.1, 70, 556.1, 556.2, 410, 411, 414, 455/456.1; 379/114.03, 114.17, 114.21, 379/114.01, 114.02, 114.13
See application file for complete search history.

(56) References Cited

U.S. PATENT DOCUMENTS

| | | | | |
|---|---|---|---|---|
| 4,704,717 A * | 11/1987 | King, Jr. | ...................... | 370/400 |
| 5,796,790 A * | 8/1998 | Brunner | ...................... | 455/406 |
| 5,862,334 A * | 1/1999 | Schwartz et al. | ............ | 709/223 |
| 6,044,260 A * | 3/2000 | Eaton et al. | .................. | 455/406 |
| 6,122,658 A * | 9/2000 | Chaddha | ...................... | 709/203 |
| 6,243,739 B1 * | 6/2001 | Schwartz et al. | ............ | 709/206 |
| 6,253,241 B1 * | 6/2001 | Chaddha | ...................... | 709/223 |
| 6,295,291 B1 * | 9/2001 | Larkins | ...................... | 370/352 |
| 6,301,471 B1 * | 10/2001 | Dahm et al. | ................. | 455/405 |
| 6,487,216 B1 * | 11/2002 | Thompson et al. | .......... | 370/466 |
| 6,526,350 B2 * | 2/2003 | Sekiyama | .................... | 701/209 |
| 6,553,313 B1 * | 4/2003 | Froeberg | .................... | 701/213 |
| 6,640,097 B2 * | 10/2003 | Corrigan et al. | .......... | 455/414.1 |
| 7,017,175 B2 * | 3/2006 | Alao et al. | .................... | 725/105 |
| 2002/0049054 A1 * | 4/2002 | O'Connor et al. | ........... | 455/426 |
| 2002/0059116 A1 * | 5/2002 | Bulatovic et al. | ............. | 705/27 |
| 2002/0065604 A1 * | 5/2002 | Sekiyama | .................... | 701/209 |
| 2002/0073084 A1 * | 6/2002 | Kauffman et al. | ............. | 707/10 |
| 2002/0077910 A1 * | 6/2002 | Shioda et al. | ................. | 705/14 |
| 2002/0107002 A1 * | 8/2002 | Duncan et al. | ............. | 455/412 |
| 2002/0107027 A1 * | 8/2002 | O'Neil | ........................ | 455/456 |
| 2002/0138560 A1 * | 9/2002 | Aaltonen et al. | ............ | 709/203 |
| 2002/0164977 A1 * | 11/2002 | Link, II et al. | .............. | 455/414 |
| 2002/0187775 A1 * | 12/2002 | Corrigan et al. | ............. | 455/414 |
| 2002/0198010 A1 * | 12/2002 | Komsi et al. | ................. | 455/466 |
| 2003/0078050 A1 * | 4/2003 | Carlborg et al. | ............. | 455/452 |
| 2003/0093476 A1 * | 5/2003 | Syed | .......................... | 709/204 |
| 2003/0096625 A1 * | 5/2003 | Lee et al. | ..................... | 455/466 |
| 2003/0181201 A1 * | 9/2003 | Bomze et al. | ............. | 455/414.3 |
| 2004/0059799 A1 * | 3/2004 | Kobata | ....................... | 709/219 |

* cited by examiner

*Primary Examiner*—CongVan Tran
(74) *Attorney, Agent, or Firm*—Vedder Price P.C.

(57) ABSTRACT

A wireless communication system (10) provides unsolicited content (40) to a wireless device (12) by using a network element (14) that contains logic circuitry that sends unsolicited content for the wireless device (12), without request by the wireless device (12) and during a non-peak period of operation of the wireless communication system (10). The network element (14) logs a billing event associated with the unsolicited content (40) in response to wireless device use indication data (42) that represents that the wireless device (12) used the unsolicited content (40) at a later time.

26 Claims, 3 Drawing Sheets

UNSOLICITED WIRELESS CONTENT DELIVERY AND BILLING APPARATUS AND METHOD

FIELD OF THE INVENTION

The invention relates generally to wireless communication systems that deliver content to a wireless device, and more particularly to methods and apparatus that deliver wireless content to a wireless device based on a time of day or system loading.

BACKGROUND OF THE INVENTION

Wireless communication systems are known that deliver internet based content to one or more wireless devices. For example, wireless cellular systems may be operatively coupled to the internet or other wide area network to wirelessly provide web pages, streaming audio and video, and other information from one or more web servers or other suitable content sources. As such, wireless devices include, but are not limited to cellular telephones, PDAs, laptop computers, pocket personal computers, internet appliances that communicate with the internet, or any other suitable wireless device that will allow a user to obtain music, video, software modules, applets, web pages, or any other suitable content using one or more wireless networks. Such wireless networks may include wireless local area networks and/or wireless wide area networks as known in the art. However, the capacity of wireless networks is limited and can be expensive during peak hours due to peak hour capacity limitations. With more and more content requiring additional bandwidth and as more and more users access limited capacity wireless communication systems, operators of such systems are continually looking for ways to maximize revenue generation for their capital expenditures in such systems.

Typically, content is delivered based upon a user requesting delivery of content by employing a wireless device to access a website where most of the system traffic occurs during peak hours. It would be desirable to reduce a wireless communication system's burden for carrying data during busy hours or periods of high system loading and still provide revenue streams for various segments of a content distribution stream.

BRIEF DESCRIPTION OF THE DRAWINGS

The present invention and the corresponding advantages and features provided thereby, will be best understood and appreciated upon review of the following detailed description of the invention, taken in conjunction with the following drawings, where like numerals represent like elements, in which.

DETAILED DESCRIPTION OF THE PREFERRED EMBODIMENT

Figure 1:
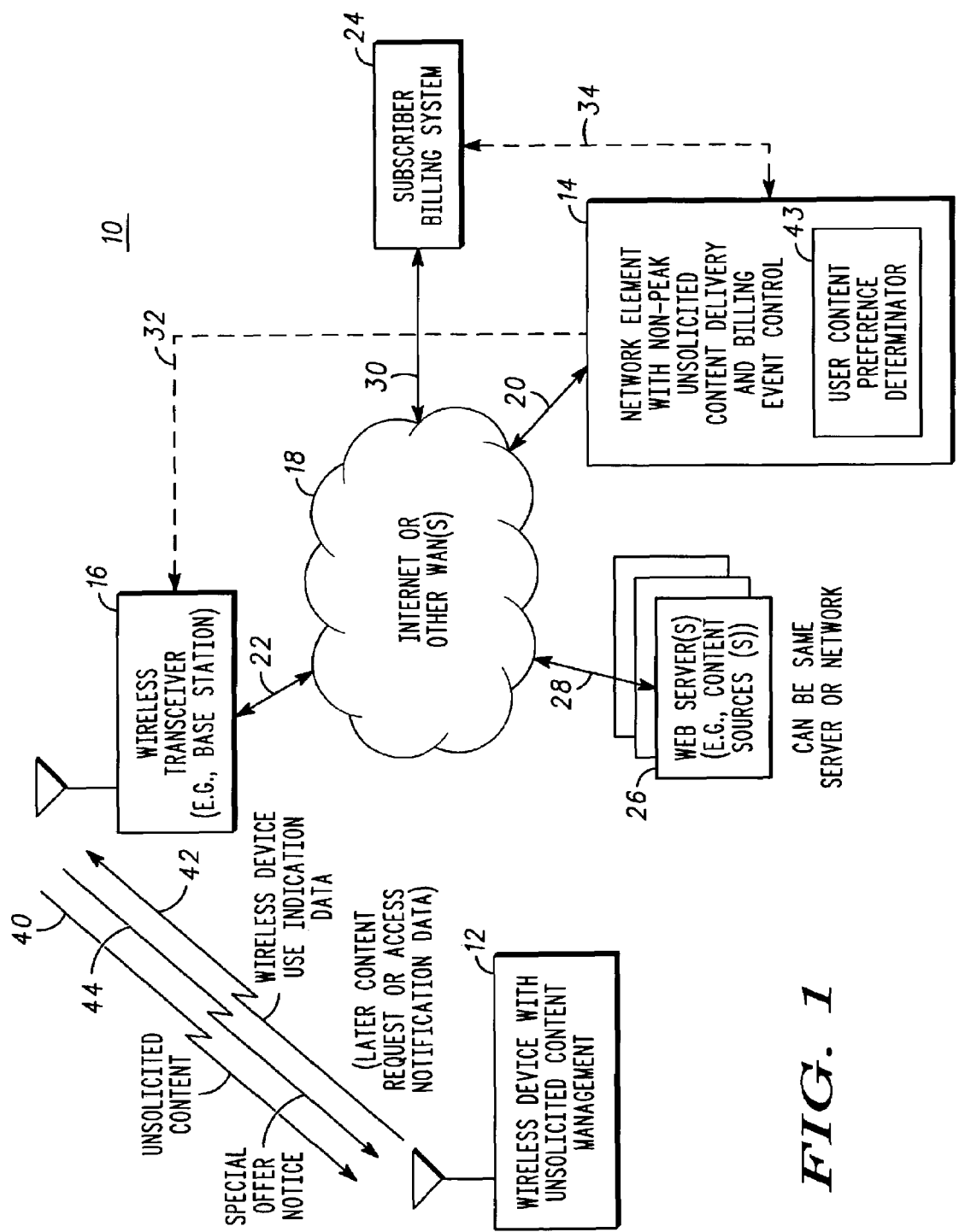
FIG. 1 illustrates one example of a wireless communication system, coupled to the internet or other suitable wiring network, for providing content to a wireless device in accordance with one embodiment of the invention.

Briefly, a wireless communication system provides unsolicited content to a wireless device by using a network element that contains logic circuitry that sends unsolicited content for the wireless device, without request by the wireless device and during a non-peak period of operation of the wireless communication system. A network element logs a billing event associated with the unsolicited content in response to wireless device use indication data that represents that the wireless device used the unsolicited content. For example, the network element logs a billing event based on a determination that the wireless device accessed the sent unsolicited content or based on a request received from the wireless device for the unsolicited content after the unsolicited content was previously received and stored by the wireless device.

A wireless device includes a wireless transceiver and wireless device logic circuitry, operatively coupled to the wireless transceiver, that controls acceptance of the unsolicited content during a non-peak period of operation of the wireless communication system, such as by storing received unsolicited content that was received during an idle mode of the wireless device. The wireless device includes memory, that contains the received unsolicited content, such as in the form of a suitable database or other suitable format. In response to a user request, the wireless device logic circuitry sends a request for content to the wireless communication system such as during a peak period, but the stored unsolicited content may already include the requested content, so the wireless communication system need not send the requested content and instead need only log the billing event indicating that the wireless device (and hence user)has used the previously sent content. Alternatively, the wireless device may determine if the stored content has been accessed, such as during an off-line session, and causes access notification data to be sent, via the wireless transceiver, to the wireless network element so that the wireless network element can again log the unsolicited content as being used by the wireless device, and as such that the user of the device is billed for unsolicited content use.

A method for providing content to a wireless device that is operative to wirelessly communicate with the wireless communication device, includes sending unsolicited content to the wireless device, without request by the wireless device, during a non-peak period of operation of wireless communication system and logging a billing event indicating that the unsolicited content was used by a wireless device based on, for example a determination, by the wireless device or by the wireless communication system, that the wireless device accessed the previously sent unsolicited content, or based on a request from the wireless device for the unsolicited content, such as during a peak period of wireless communication system operation. A wireless communication system's burden for carrying data during busy hours is thereby reduced. For example, over the course of time, a user will use the wireless device to request a download of information. The information may have been previously downloaded during the non-peak hours and so the information is not downloaded again. Only billing information is generated and if desired, communicated to the user, so that the user can be billed for the use of the information that was previously sent as unsolicited information. The system operator preferably does not charge for unsolicited information that is not used or requested by the user.

The wireless device or network element keeps track of which unsolicited content modules were obtained without being requested by a wireless device and downloaded during non-peak hours. As the content is subsequently requested or utilized, the network element keeps track of or is notified of the use so that the appropriate billing can be done. Even when the wireless device is off-line or not in RF connection with the wireless communication system, the wireless device can keep track of used content so that appropriate billing can be made via a signaling protocol at a later time.

In another embodiment, unsolicited content that was downloaded by the wireless communication system is encrypted or otherwise locked so that the content can not be used without being enabled by an authenticating or unlocking key downloaded from the network element. Such a key is used to unlock the previously sent unsolicited information when a user desires access to the unsolicited information and the sending of the key can be used to log a billing event.

Hence, unsolicited content is delivered to a wireless device during non-peak periods of the day. When and if a user requests the same information at a later time, the wireless communication system need not download the information upon request since it was previously delivered during an off-peak period.

Moreover, the network element may compile a user's prior content request history and use the history to base selections of which information to be sent as unsolicited information. In this way, it is more likely that a system operator or other entity will obtain revenue since unsolicited information that has a higher likelihood of being used by a user of the wireless device is sent during non-peak hours. In addition, the network element may cause purchase offers to be subsequently sent before unsolicited content is accessed to entice the user to request or select the already downloaded content. For example, if a song has been downloaded during non-peak hours and was not requested by the user, and hence unsolicited, an offer message is sent to the wireless device the following day, for example, requesting that the user purchase the song with a free or discounted delivery charge. Other advantages will be recognized by those with ordinary skill in the art.

FIG. 1 illustrates one example of a wireless communication system 10 that employs at least one wireless device 12 and a network element 14. Wireless communication system 10 may also include a wireless transceiver 16, such as a cellular base station or suitable wireless transceiver that communicates information wirelessly with the wireless device 12. The network element 14 may be any suitable network element including, but not limited to a server or other suitable hardware or software element. As shown, the network element 14 is in operative communication with a wide area network 18 such as the internet or any other suitable wide area network, through a suitable communication link 20. It will be recognized that although the network element 14 is shown to be coupled to the wire network 18 and to the wireless transceiver 16 through a suitable communication link 22, the network element 14 may be incorporated as part of the wide area network 18, wireless transceiver 16 or any other suitable system element. The wireless communication system 10 also includes a subscriber billing system 24 operating on a suitable server and if desired, operating on the network element 14, that maintains billing information and can suitably generate bills or any other suitable billing information as desired. One or more content sources such as web servers 26 are also suitably coupled to the wide area network 18 through a suitable communication link 28 and provide content, as known in the art, such as, but not limited to audio information, video information, web pages, images, or any other suitable content desired by a user of wireless device 12.

As shown, the subscriber billing system 24 is in operative communication with network element 20 through wireless network 18 through suitable communication link 30. The billing system may be independent or associated with any wireless communication billing system.

In another embodiment, the network element 14 may be directly coupled to wireless transceiver 16 and/or subscriber billing system 24 by suitable links 32 and 34. However, it will be recognized that any suitable communication paths may be employed.

The wireless device 12 includes suitable circuitry to provide unsolicited content management as further described below. In addition, network element 20 includes suitable circuitry to provide non-peak unsolicited content delivery and billing event control as described below.

The wireless device 12 may be any suitable wireless device including, but not limited to, a wireless device employing cellular telephone operations, and a PDA, laptop computer, other hand held device, pocket personal computer, or any other suitable wireless communication device. The wireless transceiver 16 and network element 20 may be elements of, for example, a wireless cellular system or wireless local area network as desired. For purposes of illustration only, the wireless communication system 10 will be described as a cellular wireless communication system, although any suitable wireless communication system may be employed.

Figure 2:
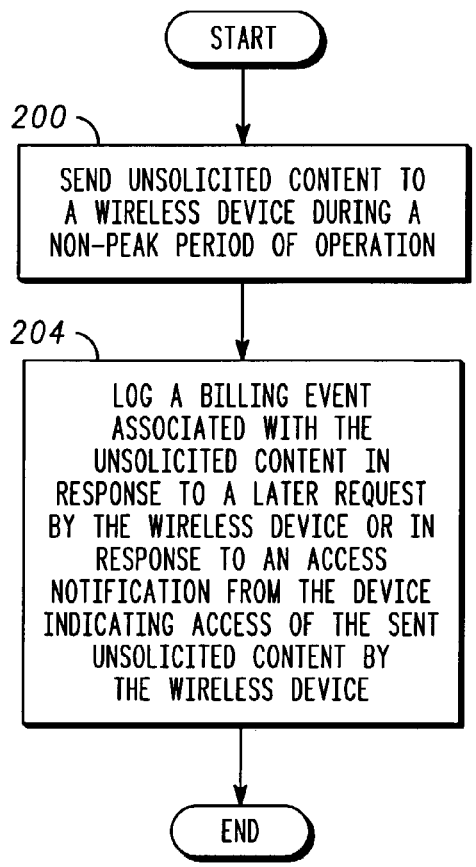
FIG. 2 is a flowchart illustrating one example of a method for providing content to a wireless device in accordance with one embodiment of the invention.
Figure 3:
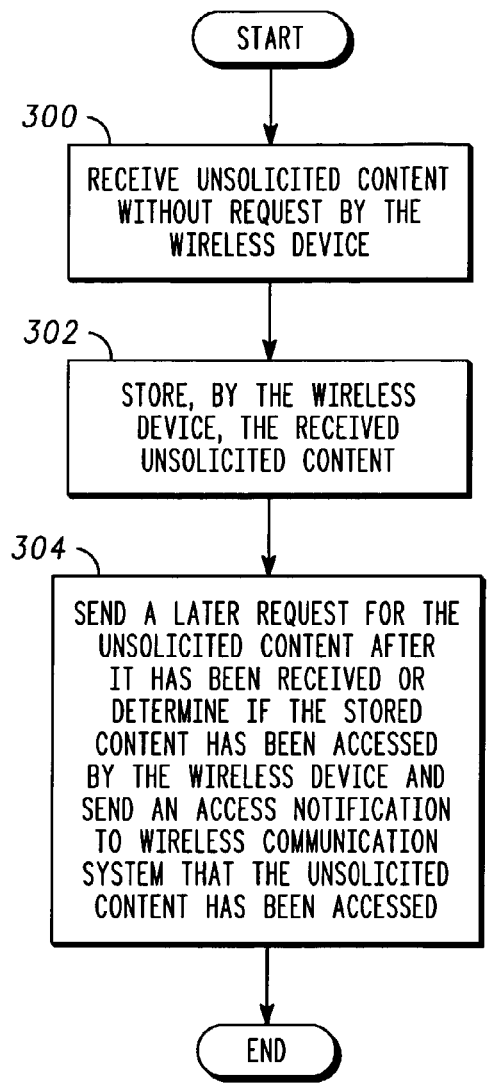
FIG. 3 is a flowchart illustrating one example of a method for providing content to a wireless device in accordance with one embodiment of the invention.

Referring also to FIGS. 2 and 3, the operation of the network element 14 (FIG. 2) and the operation of wireless device 12 (FIG. 3) will be described. The network element 14 includes logic circuitry, such as discrete logic circuitry or one or more processing devices that execute programmable instructions to carry out the operations described herein, or any suitable combination of hardware, software or firmware. Hence, the network element 14 is operative to send unsolicited content for the wireless device 12 during a non-peak period of operation of the wireless communication system 10. For example, network element 14 may be included as part of a web server 26 to automatically push audio information, web pages, or video information to one or more wireless devices 12 during non-peak periods of operation of the wireless communication system 10. As used herein, non-peak periods of operation will be any suitable time or times of the day deemed to be non-peak periods by a system operator, service provider or other billing entity and which may be based on clock time or actual measured real-time system loading. Various content providers may for example, subscribe to a service operated by the system operator that allows their respective content to be pushed without a previous request by a user, (and hence unsolicited) during non-peak periods of the day. For example, network element 14 causes unsolicited content 40 as provided by content source 26 during non-peak periods of operation. This may be done, for example by network element 14 requesting content from a content source such as web servers 26 and the network element 14 then subsequently communicates the unsolicited content to wireless transceiver 16, which communicates the unsolicited content 40 via a suitable communication channel to wireless device 12, when for example, the wireless device 12 is in idle mode and during a non-peak period of operation of the wireless communication system 10. The unsolicited content 40 is not requested by a user device 12 before it is sent and therefore is termed to be unsolicited content.

As shown, for example in block 200 (FIG. 2) providing content to the wireless device 12 includes sending unsolicited content to the wireless device 12 during a non-peak period of operation. As shown in block 300, a method for providing content to a wireless device includes receiving, by the wireless device 12, the unsolicited content 40 without request by the wireless device 12 during a non-peak period of operation of the wireless communication system 10. As shown in block 302, the wireless device 12 stores the received unsolicited content 40 locally in memory. As shown in block 304, a user of wireless device 12 is billed for use of the unsolicited content based on wireless device use indication data 42 that is communicated by the wireless device 12, to the network element 14. By way of illustration, the unsolicited content 40 is a plurality of content modules, such as a plurality of HTML pages, a plurality of songs in the form of, for example, audio files, or other suitable content modules, which are sent during non-peak periods. A user of wireless device 12 may request for example, during a peak period on the same day or the following day, access to a song that has already been pushed, transparent to the user, by the network element 14 as unsolicited content 40, to the wireless device 12. Therefore, in one embodiment, the wireless device 12 may send a request as a type of wireless device use notification data, for the unsolicited content to the wireless communication system 10, such as by a user entering a URL or other designation during a peak, or non-peak, period of time to download a particular song. Since the particular song has already been pushed to the wireless device, transparently to the user, as unsolicited content, the wireless communication system 10 need not resend the song during peak hours but need only record that the user wishes to have access to the previously downloaded information for billing purposes.

Also, the network element 14 may, for example send a decoding, decrypting or unlocking key in response to the request, to allow the wireless device 10 to decrypt or unlock the previously sent unsolicited song as described further below. In any event, the wireless communication system 10 need only receive a request by a user or other use indication, and need not download the requested content during peak hours, since it was already downloaded, transparently to the user, during non-peak periods of operation.

In another embodiment, as shown in block 304, the method includes determining if the stored unsolicited content has been accessed by the wireless device 12, and if so, notifying the wireless communication system 10 that the user has accessed previously sent unsolicited content. This may be done in any suitable manner, including for example sending an access notification message such as access notification data as a form of wireless device use indication data 42, to the network element 14 when a user of the wireless device accesses a stored song that was previously downloaded and stored in an unsolicited content file or folder. The wireless device 12 having stored the information in an unsolicited content folder, for example is aware that this content was not previously paid for and automatically sends access notification data to the network element 14 so that the operator of the system can bill the user of device 12 for the use of the song. Other techniques may also be used.

As shown in block 204, once the network element 14 has determined, or has been made aware, that the previously sent unsolicited content has been used or is being used, the network element logs the billing event for the particular unsolicited content in response to, for example, either a later request by the wireless device 40 content, or as noted, in response to access notification data from the wireless device indicating that the wireless device has accessed the unsolicited content. Hence, a logging of a billing event, by the network element, is performed based at least on whether a determination, such as by the wireless device or by the network element, that the wireless device accessed the sent unsolicited content or based on a request in the form of for example, the wireless device use indication data 42 from the wireless device for the unsolicited content. A request for the content may occur during peak periods of operation or non-peak periods of operation. The user of device 12 is billed for using the content at a point when the content is used.

As noted above, the network element 14 causes the unsolicited content 40 to be sent, for example, during an idle mode of the wireless device 12 and may send a plurality of unsolicited content modules for local stores on the wireless device 12. As part of logging a billing event, the network element 14 may access, for example the subscriber billing system 24 and record that the unsolicited content has been used and generate, for example, a bill or other indication of user billing information indicating use of the unsolicited content by the wireless device by an associated user.

Either the wireless device 12 or the network element 14 may keep track of which sent unsolicited content modules were accessed without being requested by the wireless device. This will be described with reference to FIG. 4 below.

The network element 14 may also include a user content preference determinator 43 such as suitable software program executing on one or more processing devices, that records a user's prior content history in the form for example of a user profile, tracking the previous solicited content requested by the user or unsolicited content selected or used by the user so that future unsolicited content can be more appropriately selected based on the likely user preferences. As such, network element 20 may maintain a wireless device database or user database that keeps track of the prior requested or user-selected unsolicited content so that, for example, the network element 14 may determine that a particular user requests a lot of country music and as such, unsolicited content 40 may include new country songs along with country singer information so that a system operator is more likely to gain revenue from the unsolicited content 40.

The network element 14 may also send data representing marketing/sales offers associated with certain unsolicited content. This is represented as special offer notice data 44. For example, after unsolicited content 40 has been sent during non-peak hours, the following day, special offer notice data 44 may be sent by the network element 14 notifying a user of wireless device 12 that if the user accesses a previously downloaded song, the user will receive a discount. If the user requests the information or selects the information stored within the wireless device, the network element 14 logs an appropriate billing event by, for example, applying an associated discount and logging this as part of a user's billing statement. As such, logging a billing event may include, among other things, debiting a user account based on a billing event or providing other billing related information. In addition, the network element 14 may send billing information to the wireless device via a wireless link relating to the billing event soon after the event was recorded so that the user knows immediately that the user of wireless device 12 has been billed for access to previously unsolicited content.

As noted above, one mechanism for tracking whether or not unsolicited content has been used by a wireless device 12, may include for example sending, such as by the network element 14, encrypted or locked unsolicited content to the wireless device 12 and if the user requests the information or attempts access to the information stored on the wireless device 12, the network element 14 sends a decryption or unlocking key to the wireless device based on a request from the wireless device for the unsolicited content. The network element 14 then logs, as a billing event, access to the information when the decryption key is sent. As such, tracking of the decryption key can be an indication as to whether or not a user should be billed for access for using unsolicited content.

Figure 4:
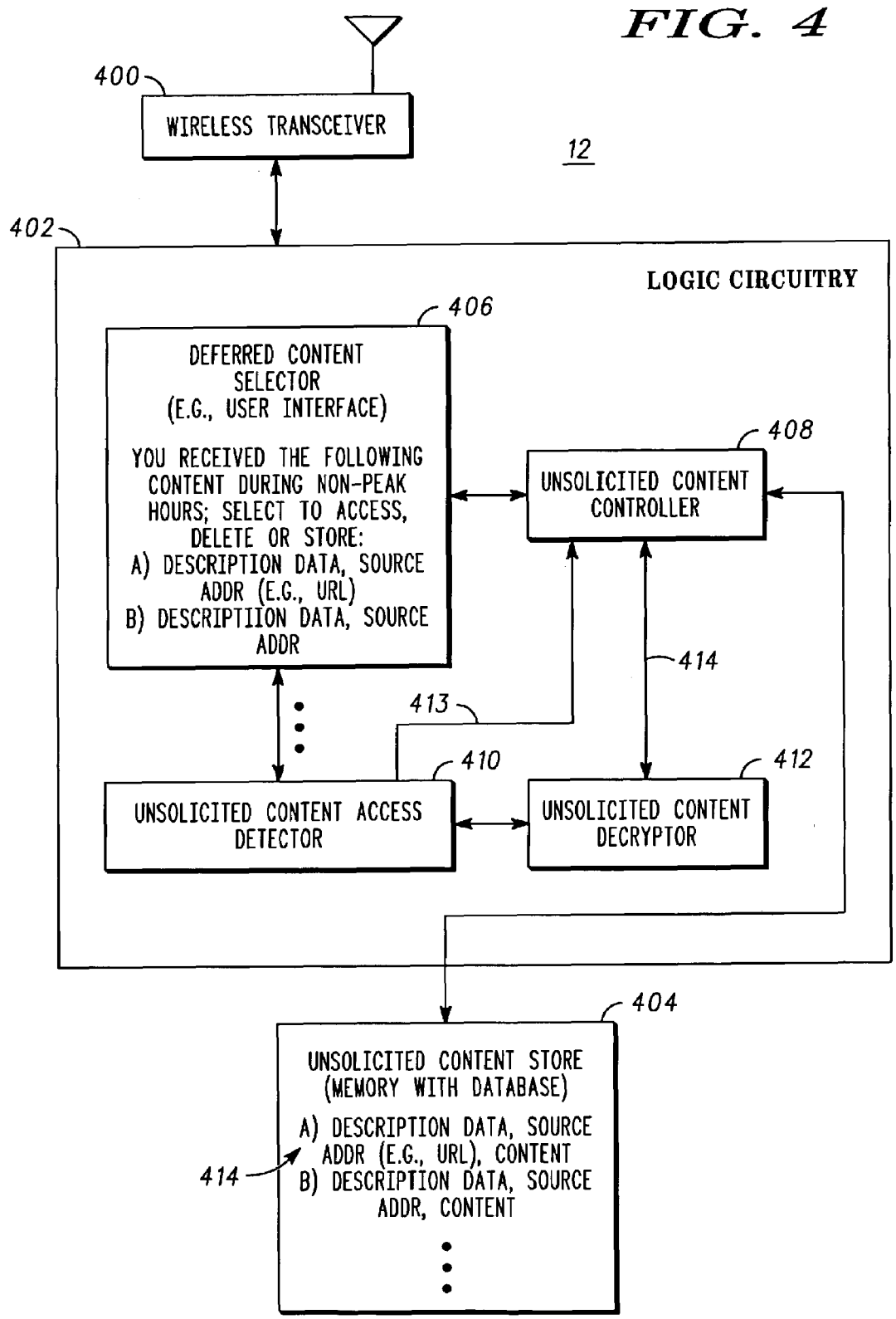
FIG. 4 is a block diagram illustrating one example of a wireless device in accordance with one embodiment to the invention.

FIG. 4 is a block diagram illustrating one example of a wireless device 12 with unsolicited content management that includes a wireless transceiver 400, logic circuitry 402 and memory that serves as an unsolicited content store 404. The wireless transceiver 400 may be any suitable wireless transceiver as known in the art. The logic circuitry 402 as noted above, may be discrete logic or may be one or more processors executing instructions that cause the one or more processors to carry out the operations described herein, or any suitable combination of hardware, software or firmware.

The logic circuitry 402 includes a deferred content selector 406, an unsolicited content controller 408, an unsolicited content access detector 410 and an unsolicited content decryptor 412. Preferably, although not necessary, the blocks shown may be suitably implemented as software applications executing on one or more processing devices. A processing device may include but not limited to, for example, microcontrollers, microprocessors, DSPs, or any other suitable processing device. The unsolicited content controller 408 receives, for example during an idle mode of the wireless device 12, a plurality of unsolicited content modules, such as multiple HTML pages, audio files, video files or other suitable information and locally stores the unsolicited content modules in the unsolicited content store 404, which preferably occurs transparent to a user of the device 12. The unsolicited content store 404 may be any suitable memory and may, if desired, be memory containing a database wherein the unsolicited content is stored as one more database entries that include, for example, description data generally describing the unsolicited content, such as whether the information is music; a source address such as a URL identifying where the unsolicited content came from; and the content itself. This is shown as information 414. Under control of the unsolicited content controller 408, or in response to a menu selection by a user, the deferred content selector 406 which is presented, such as by a suitable processor, as a wireless device user interface which contains data representing the stored unsolicited content to allow user selection of the received unsolicited content. For example, the unsolicited content controller 408 may present the deferred content selector 406 during peak hours or non-peak hours to allow a user to view the unsolicited content that is currently stored in the unsolicited content store 404 on the wireless device 12.

As shown, for example, the deferred content selector 406 may indicate that a user received certain information during non-peak hours and allows the user to select the information to access it, delete the information, or restore the information for later access through suitable GUI buttons or menus. The deferred content selector 406 may, for example, provide the description data and the source address associated with a given unsolicited content module or modules. The user may then highlight the description data or otherwise select the stored unsolicited content through the deferred content selector 406. In response to selection of the stored unsolicited content, the unsolicited content access detector 410 detects which unsolicited content has been selected and generates wireless use device indication data 413 which serves as selection notification data, for the wireless communication system 10. The unsolicited content controller then transmits the wireless device use indication data 413 to the network element to inform the network element that a user is using pre-downloaded unsolicited content so the network element can then bill the user without having to resend the content to the user.

In addition, the unsolicited content access detector 410 keeps track of which received unsolicited content modules were accessed from memory when the wireless device is not in communication (off-line) with the wireless communication system 10. As such, the wireless device use indication data 413 is not transmitted by the unsolicited data content controller 408 until the wireless device 12 is back in communication with the network element at a later time. As such, a batch-type approach to communicating content use indication is provided. The use indication data 412 may be sent to the wireless communication system, during a peak period of operation of wireless communication system (or non-peak period) but when during a peak period, a reduction in communication bandwidth is achieved since the content was previously sent during a non-peak period.

The unsolicited content store 404 may be a suitable RAM, ROM, or any other suitable memory element or elements as desired.

In an embodiment where the unsolicited content is encrypted or locked by the network element, the unsolicited content decryptor or key 412 decrypts or unlocks selected stored unsolicited content from unsolicited content store 404 using a decryption or unlocking key 414 provided by the network element and received by the unsolicited content controller. As such, non-requested downloaded content modules can not be accessed without a decryption key provided by the network element. The decryption key 414 is used to unlock the downloaded unsolicited content and ensures proper billing since the network element does not release a decryption key until it logs a billing event associated with the given content.

In another embodiment, the management of the unsolicited content stored in the wireless device is done in the network. The network keeps track of the unsolicited content that was sent and which wireless device received the unsolicited content. When a request is made by the wireless device, the network knows that the unsolicited content is already stored in the wireless device.

Also, if desired, the subscriber may use the wireless device to request downloads that the subscriber subsequently may or may not accept. For example, the subscriber may request that the network send the wireless device content (in the off hours) that a subscriber "might" wish to buy. Basically, the off-hours airtime is free so the network operator might want to fill the request with prospective sales. Also, the subscriber can explicitly (vs. having to learn) request the kinds of content that the subscriber is interested in having available to him—for example the type of music he likes can be stored in a profile.

As such as described herein, unsolicited content is delivered to a wireless device during less busy hours. When and if a user of the wireless device requests content, downloading of the content is not necessary, since it is already stored on the device and only billing is needed. This can reduce the wireless communication system's burden for carrying information during busy hours. Hence, any unsolicited information that has been previously downloaded during off-hours is not downloaded again during busy hours. Only billing information is communicated so that a user can be billed for the information as it is used. Preferably, the network element does not charge for unsolicited information that is not used or requested by a user of the wireless device. The unused information as noted above can be deleted by, for example, a user or after a certain time-out period has occurred. Other variations and advantages will be recognized by those of ordinary skill in the art.

The above detailed description of the invention and the examples described therein have been presented for the purposes of illustration and description. It is therefore contemplated that the present invention cover any and all modifications, variations or equivalents that fall within the spirit and scope of the basic underlying principles disclosed above and claimed herein.

What is claimed is:

1. A method for providing content to a wireless device that is operative to wirelessly communicate with a wireless communication system comprising:
   determining preferred content for sending as unsolicited content, based on at least one of:
   a user's prior history and a user's previously requested content;
      sending the unsolicited content to the wireless device, without request by the wireless device and during a non-peak period of operation of the wireless communication system; and
      logging a billing event associated with the unsolicited content in response to at least one of:
      a determination that the wireless device accessed the sent unsolicited content; and
      a request from the wireless device for the unsolicited content.

2. The method of claim 1 wherein the step of sending the unsolicited content to the wireless device, without request by the wireless device and during a non-peak period of operation, includes sending, during an idle mode of the wireless device, a plurality of unsolicited content modules for local storage on the wireless device.

3. The method of claim 1 wherein logging a billing event associated with the unsolicited content includes generating user billing information indicating use of the unsolicited content by the wireless device associated with the user.

4. The method of claim 1 wherein logging the billing event associated with the unsolicited content includes keeping track of which sent unsolicited content modules were accessed without being requested by the wireless device.

5. The method of claim 1 including sending data representing marketing/sales offers associated with certain content that has already been sent as unsolicited content to the wireless device.

6. The method of claim 1 including at least one of: debiting a user account based on the billing event and sending billing information to the wireless device relating to the billing event.

7. The method of claim 1 wherein sending the unsolicited content to the wireless device, without request by the wireless device and during a non-peak period of operation includes sending encrypted unsolicited content to the wireless device and sending a decryption key to the wireless device based on a request from the wireless device for the unsolicited content and wherein the step of logging the billing event includes logging the billing event in response to sending the decryption key to the wireless device.

8. The method of claim 1 wherein the unsolicited content includes at least one of data representing: audio, video, an HTML page, and an XML page.

9. A method for providing content for a wireless device that is operative to wirelessly communicate with a wireless communication system comprising:
   receiving, by the wireless device, unsolicited content without request by the wireless device and during a non-peak period of operation of the wireless communication system, wherein the unsolicited content is preferred content determined based on at least one of: a user's prior history and a user's previously requested content;
   storing, by the wireless device, the received unsolicited content; and
   performing at least one of:
      sending a request for the unsolicited content to the communication system; and
      determining if the stored unsolicited content has been accessed and notifying the wireless communication system of the same.

10. The method of claim 9 wherein the step of receiving the unsolicited content by the wireless device, without request by the wireless device and during a non-peak period of operation, includes receiving, during an idle mode of the wireless device, a plurality of unsolicited content modules and locally storing the unsolicited content modules on the wireless device.

11. The method of claim 9 including presenting a wireless device user interface containing data representing the stored unsolicited content that allows user selection of the received unsolicited content; and
   in response to selection of the stored unsolicited content, generating wireless device use indication data for the wireless communication system.

12. The method of claim 9 including keeping track of which received unsolicited content modules were accessed from memory by the wireless device when the wireless device is not in communication with the wireless communication system.

13. The method of claim 12 including sending wireless device use indication data to the wireless communication system, during a peak period of operation of the wireless communication system, indicating that unsolicited content that was previously received during a non-peak period has been used by the wireless device.

14. A wireless device comprising:
   a wireless transceiver;
   logic circuitry, operatively coupled to the wireless transceiver, and operative to control acceptance of unsolicited content during a non-peak period of operation of a wireless communication system, wherein the unsolicited content is preferred content determined based on at least one of: a user's prior history and a user's previously requested content; and
   memory, operatively coupled to the logic circuitry, containing the received unsolicited content;
   the logic circuitry also operative to perform one of:
      sending a request for content to the wireless communication system; and
      determining if the stored content has been accessed and causing access notification data to be sent, via the wireless transceiver, to the wireless communication system.

15. The wireless device of claim 14 wherein the logic circuitry includes at least one processor that executes programming instructions, stored in memory, that:
   controls acceptance of unsolicited content during a non-peak period of operation of a communication system, and
   performs one of: sending a request for content to the communication system and determining if the stored content has been accessed and causing an access notification to be sent, via the wireless transceiver, to the wireless communication system.

16. The wireless device of claim 15 wherein the logic circuitry keeps track of which sent unsolicited content was accessed without being requested by the wireless device, and sending the access notification data based on whether stored unsolicited content was accessed.

17. The wireless device of claim 14 wherein the logic circuitry controls receiving of a plurality of unsolicited content modules, without request by the wireless device during a non-peak period of operation of the wireless communication system and during an idle mode of the wireless device for local storage on the wireless device.

18. The wireless device of claim 14 wherein the control logic presents a interface containing data representing the stored unsolicited content that allows user selection of the received unsolicited content; and in response to selection of the stored unsolicited content, generates wireless device use indication data for the wireless communication system.

19. The wireless device of claim 14 wherein received unsolicited content is encrypted and wherein the logic circuitry decrypts stored encrypted unsolicited content using a decryption key received from the wireless communication system, to allow user access to the stored unsolicited content.

20. A network element operatively coupled with a wireless communication system for providing content to a wireless device comprising:

logic circuitry operative to determine preferred content for sending as unsolicited content, based on at least one of: a user's prior history and a user's previously requested content, wherein the logic circuitry is further operative to send the unsolicited content for the wireless device, without request by the wireless device and during a non-peak period of operation of the wireless communication system, and further operative to log a billing event associated with the unsolicited content in response to at least one of: a determination that the wireless device accessed the sent unsolicited content and a request from the wireless device for the unsolicited content.

21. The network element of claim 20 wherein the logic circuitry causes sending of the unsolicited content to the wireless device, without request by the wireless device and during a non-peak period of operation, sends, during an idle mode of the wireless device, a plurality of unsolicited content modules for local storage on the wireless device.

22. The network element of claim 20 wherein the logic circuitry generates user billing information indicating use of the unsolicited content by the wireless device associated with the user in response to at least one of: a determination that the wireless device accessed the sent unsolicited content and a request from the wireless device for the unsolicited content.

23. The network element of claim 20 wherein the logic circuitry causes the sending of data representing marketing/sales offers associated with certain content that has already been sent as unsolicited content to the wireless device.

24. The network element of claim 20 wherein the logic circuitry debits a user account based on the billing event and sends billing information to the wireless device relating to the billing event.

25. The network element of claim 20 wherein the logic circuitry causes sending of the unsolicited content to the wireless device, without request by the wireless device and during a non-peak period of operation by sending encrypted unsolicited content to the wireless device and sending a decryption key to the wireless device based on a request from the wireless device for the unsolicited content and logs the billing event in response to sending the decryption key to the wireless device.

26. A wireless communication system for providing content to a wireless device comprising:

at least one wireless device and at least one network element, operatively coupled with the wireless device including:

logic circuitry operative to determine preferred content for sending as unsolicited content, based on at least one of: a user's prior history and a user's previously requested content, wherein the logic circuitry is further operative to send the unsolicited content for the wireless device, without request by the wireless device and during a non-peak period of operation of the wireless communication system, and further operative to log a billing event associated with the unsolicited content in response to at least one of: a determination that the wireless device accessed the sent unsolicited content and a request from the wireless device for the unsolicited content; and wherein the at least one wireless device including:

a wireless transceiver;

wireless device logic circuitry, operatively coupled to the wireless transceiver, and operative to control acceptance of the unsolicited content during a non-peak period of operation of the wireless communication system; and memory, operatively coupled to the wireless device logic circuitry, containing the received unsolicited content;

the wireless device logic circuitry also operative to perform one of:

sending a request for content to the wireless communication system; and determining if the stored content has been accessed and causing access notification data to be sent, via the wireless transceiver, to the wireless network element.

* * * * *